United States Patent [19]

Couser

[11] Patent Number: 4,502,545
[45] Date of Patent: Mar. 5, 1985

[54] FOLDING TOOL BEAM AND LIFT ASSEMBLY

[76] Inventor: Chester F. Couser, 1117 Acre St., Guttenberg, Iowa 52052

[21] Appl. No.: 510,625

[22] Filed: Aug. 5, 1983

Related U.S. Application Data

[63] Continuation of Ser. No. 273,968, Jun. 15, 1981, Pat. No. 4,402,367.

[51] Int. Cl.³ .................... A01B 73/00; A01B 23/04
[52] U.S. Cl. .................... 172/311; 172/456
[58] Field of Search ............ 172/311, 456, 776, 439, 172/443, 446, 679; 280/411 R, 413, 411 A, 411 B, 411 C, 656 L

[56] References Cited

U.S. PATENT DOCUMENTS

| | | | |
|---|---|---|---|
| 3,542,138 | 11/1970 | Fackler | 172/311 X |
| 3,606,848 | 9/1971 | Dobbs et al. | 172/311 X |
| 3,743,029 | 7/1973 | Mills | 172/776 X |
| 3,774,694 | 11/1973 | Gates | 172/776 X |
| 4,056,149 | 11/1977 | Honnold | 172/311 |
| 4,126,187 | 11/1978 | Schreiner et al. | 172/311 |
| 4,128,131 | 12/1978 | Bucher et al. | 172/311 |
| 4,360,215 | 11/1982 | Nohl et al. | 172/311 X |

FOREIGN PATENT DOCUMENTS

| | | | |
|---|---|---|---|
| 230279 | 3/1958 | Australia | 280/411 C |

*Primary Examiner*—Richard J. Johnson
*Attorney, Agent, or Firm*—Glenn H. Antrim

[57] ABSTRACT

A pair of tool beams with support hitches for ground working implements, the support hitches being placeable at desired positions along the tool beams. By placement of hitches at desired positions, old and new implements for working different numbers of rows may be pulled by a large tractor. The tool beams are connected through linkages or hinges to a forward draft beam such that the tool beams can be turned from a transverse working position to a longitudinal, trailing position for transportation. In the position for transportation, the implements are positioned toward a center line between the tool beams. The hitches for the implements are connected to the tool beams through power lift supports for raising the implements, and the implements are held in a raised position while being transported and while the tool beams are being folded and unfolded.

3 Claims, 9 Drawing Figures

FOLDING TOOL BEAM AND LIFT ASSEMBLY

This is a continuation of application Ser. No. 273,968 filed June 15,1981, now U.S. Pat. No. 4,402,367.

BACKGROUND OF THE INVENTION

This invention relates to folding tool beams for attaching groundworking implements behind tractors in either working positions or transporting positions, and particularly to tool beams to which are attached hitches that include lifting means for raising implements, the beams being rotatable about pivots while the implements are raised until the beams are in a longitudinal, trailing position for transportation.

A common example of decreasing the width of ground working implements for transportation is the folding of end wing portions of disc harrows upwardly about horizontal axes of pivots at the ends of transverse central portions. In a different arrangement for disc harrows shown in U.S. Pat. No. 4,223,743 issued to Harold K. Garrison on Sept. 23, 1980, wheels are lowered hydraulically to raise discs from the ground, the tool beams for the discs are rotated about separated respective pivots to a trailing position. A relatively narrow disc assembly trails between the pivots and is raised for transportation.

These prior tool beams are generally adapted to implements of only one type and are not variable in width. The tool beams that folds upwardly may not be suitable for implements, such as planters, having containers for fluid materials, and additional stress in the folded position requires tool beams of greater than usual strength.

SUMMARY OF THE INVENTION

The present tool beam assembly comprises a draft beam to be connected to a tractor, a pair of folding tool beams, supported on caster wheels, connected to the draft beam, and one or more hitch-and-lift assemblies attached to each of the tool beams for supporting ground working implements in either working or transporting positions. Each tool beam is connected to a hinged end or wing of the draft beam by two pivotal rods of different lengths, and a hydraulic cylinder is connected to one of the rods of each beam for folding the tool beams.

In a working position, the tool beams are positioned by the pivotal rods end to end, behind and parallel to the draft beam. Each wing of the draft beam is pivotally connected to a respective end of a middle portion of the draft beam such as to be rotated about a longitudinal, horizontal axis, and thereby each tool beam and its implements are free to follow the contour of the ground.

To fold the tool beams, the implements are first raised from the ground by operation of hydraulic cylinders in the hitch-and-lift assemblies, and then the hydraulic cylinders connected to the pivotal rods are operated to move the outer end of each tool beam rearwardly and inwardly while the inner end is moved outwardly in an arcuate path rearwardly and then forwardly to a position a short distance behind and not quite out to the end of the draft beam. The tool beams are now trailing perpendicular to the draft beam and the implements are positioned between the tool beams.

The hitch-and-lift assemblies are clamped to the tool beams by U-bolts to be set at any required positions along the length of the beams. Through the use of this tool beam assembly, available implements for a certain number of rows of crops may be connected to a tool beam with other or newly acquired implements to be pulled by a tractor with greater power than a tractor previously used for only a part of the implements. The implements that were formerly used can therefore be used with new implements of moderate size rather than being traded in to purchase larger new implements.

The hitch-and-lift assemblies include conventional hitches, and the conventional hitches are attached to lifting arms pivotally attached to plates that are connected to the tool beams by U-bolts. One embodiment uses three lifting arms and special hinges, and another embodiment uses four pivotal arms in a parallel arrangement. Each hitch can be raised or lowered separately to facilitate working longer rows at one side of a tractor on a point of a field while implements on the other side are raised from the ground.

Another embodiment of a draft beam with folding tool beams has a single rigid piece for a draft beam and a pair of relatively short longitudinal connecting beams extending rearwardly from respective ends of the draft beam. The longitudinal connecting beams have caster wheels extending rearwardly and are connected to the draft beam by forward pivots to permit the wheels to follow the contour of the ground. The tool beams are also supported on caster wheels and inner or forward ends of the tool beams are pivotally connected to the outer sides of the respective longitudinal connecting beams near the rear ends thereof to permit vertical movement of the tool beams for following the contours of ground and horizontal turning of the tool beams from outward, transverse working positions to longitudinal trailing positions. To work ground in the space between the longitudinal connecting beams, implements are connected to the draft beam.

DESCRIPTION OF THE PREFERRED EMBODIMENTS

Figure 1:
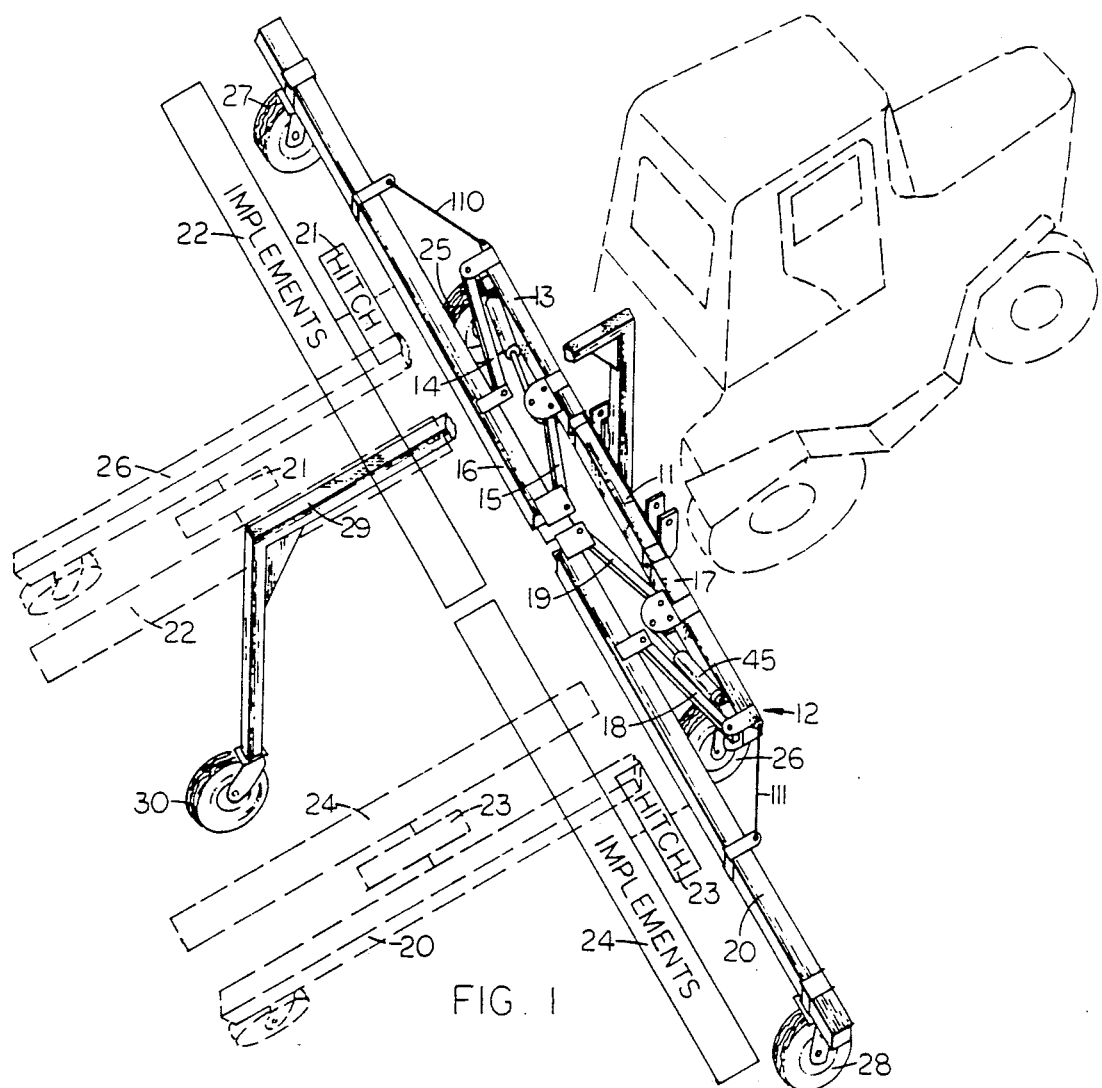
FIG. 1 is a perspective view of a preferred folding tool beam and lift assembly of this invention showing working and transporting positions.

In FIG. 1, central portion 11 of a draft beam 12 has usual brackets to be connected to a hitch of a tractor. A left wing portion 13 of the draft beam 12 is pivotally connected through rods 14 and 15 to a left tool beam 16, and a right wing portion 17 is connected through rods 18 and 19 to a right tool beam 20. A hitch-and-lift assembly 21 is connected to the left tool beam 16 to support and to pull implements 22, and likewise a hitch 23 is connected to the right tool beam 20 to support implements 24. The tool beams 16 and 20 as shown in solid lines of FIG. 1 are positioned in a working position parallel to the draft beam 12 and as shown in dashed lines are positioned perpendicular to the draft beam 12 for transportation. The tool beam assembly is supported by caster wheels 25 and 26 at the ends of the draft beam 12 and by caster wheels 27 and 28 at the outer ends of the respective tool beams 16 and 20. An archlike beam 29 has a lower front end connected to the center of the draft beam 12 and a rear lower end supported on a caster wheel 30.

Figure 2:
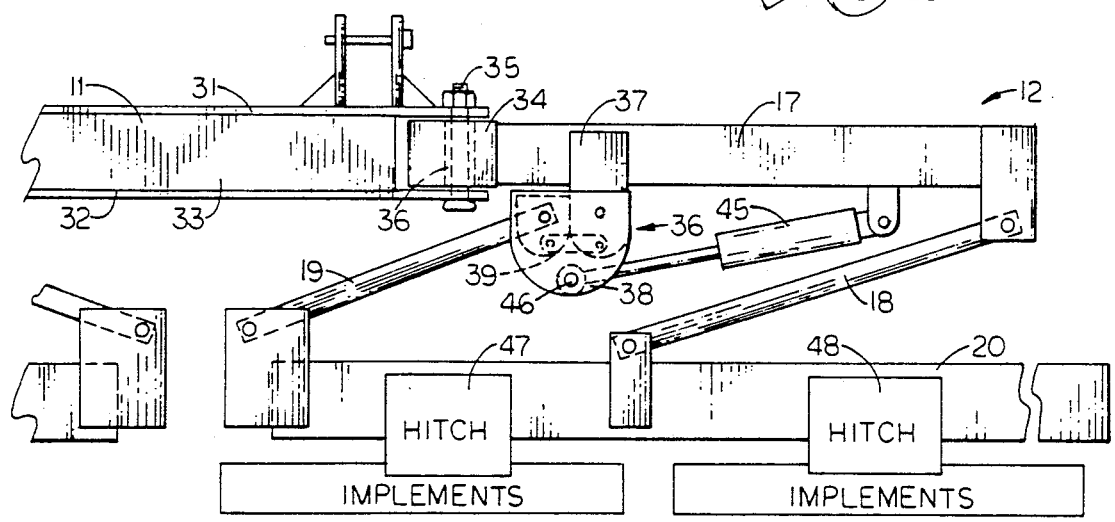
FIG. 2 is a top, schematic view of the right portion of FIG. 1 in a working position.
Figure 3:
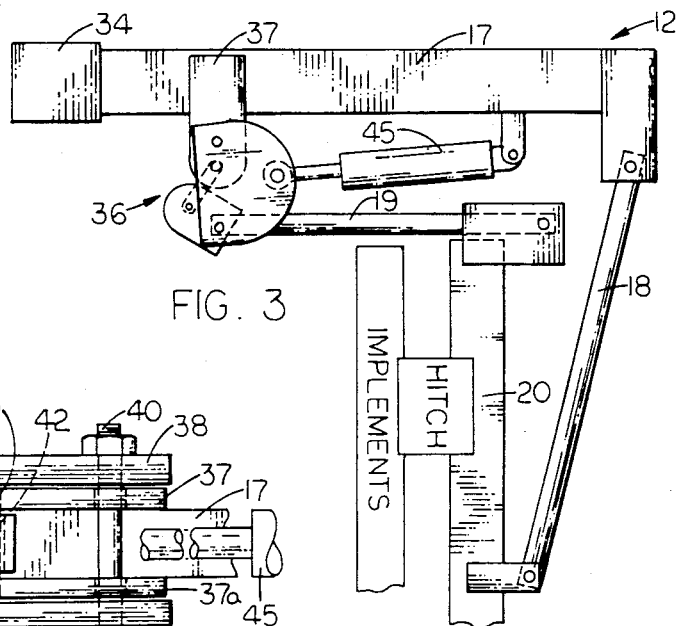
FIG. 3 is a fragmentary view of FIG. 2 in a transporting position.

The connections between three main portions of the draft beam 12 and between the beam 12 and each of the tool beams 16 and 20 are shown more clearly in the schematic diagram of FIG. 2 in which the connection to the right tool beam 20 to the right wing portion 17 is shown while the tool beam is in a working position and in FIG. 3 while the tool beam 20 is in a transporting position. The central portion 11 of the draft beam 12 comprises bars 31 and 32 extending along the sides and somewhat beyond each end of a piece of tubing 33, the ends of the bars extending beyond the tubing 33 receiving a piece of tubing 34 that fits over an end of a main piece of tubing for the wing portion 17. A bolt 35 extends horizontally through the ends of the bars 31 and 32 and through a smaller piece of tubing 36, the bolt and the small piece of tubing functioning as a bearing inside the piece of tubing for the right wing portion 17. The right wing portion 17 is free to turn about the bolt 35 as required to follow the contour of ground at the right side of a tractor to which the draft beam 12 is connected.

The connecting rod 18 is somewhat longer than the connecting rod 19 and has one end pivotally connected to the outer end of the wing portions 17. The other end of the connecting rod 18 is pivotally connected at a point spaced from the inner end of the tool beam 20 such that when the tool beam 20 is perpendicular to the wing portion 17, the inner end of the beam 20 is spaced a short distance behind and not quite as far out as the outer end shown in FIG. 3. One end of the other connecting rod 19 is connected through a special hinge 36 shown partly cut away as viewed from the rear in FIG. 4, and the other end is pivotally connected to the inner end of the tool beam 20.

Figure 4:
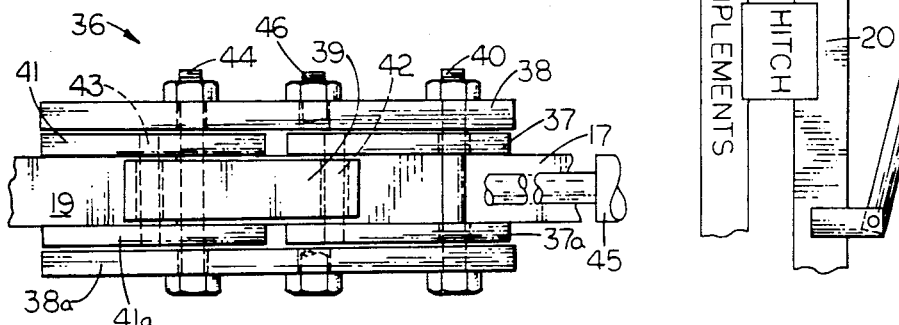
FIG. 4 is a rear view of a special hinge shown in FIGS. 2 and 3.

The hinge 36 is similar to the hinge described in U.S. Pat. No. 3,680,172 issued to the present inventor on Aug. 1, 1972. With reference to FIGS. 2 and 4, short lengths of iron bars 37 and 37a are welded to opposite sides of the tubing comprising the wing portion 17 and extend rearwardly a short distance to function as a fixed portion of the hinge 36. Two linkages 38 and 39 of different lengths are connected between the iron bars 37 and 37a and the connecting rod 19. The longer linkage comprising a pair of outer plates 38 and 38a is pivotally connected to the bars 37 and 37a by a bolt 40 and pivotally connected by a bolt 44 to a pair of separated plates 41 and 41a welded to opposite sides of the forward end of the connecting rod 19. One end of the shorter linkage 39 is pivotally connected by a pin 42 between the fixed plates 37 and 37a, and the other end is connected by a pin 43 between the plates 41 and 41a that are welded to the connecting rod 19.

One end of a hydraulic cylinder 45 (FIG. 2) for turning the tool beam 20 is pivotally connected by a bolt 46 between the outer portions of the plates 38 and 38a, the longer linkage, and the other end of the cylinder 45 is connected to the wing 17 at a point toward its outer end. The bolt 46 is in a rearward position while the tool beam 20 is in a parallel position for working. The lengths of the linkages 38 and 39 of the hinge 36 and the positions of their pivots are selected to provide the amount of motion required to turn the tool beam 20 from a parallel position to a perpendicular position as the bolt 46 is rotated about the bolt 40 in response to the operation of the cylinder 45.

Figure 5:
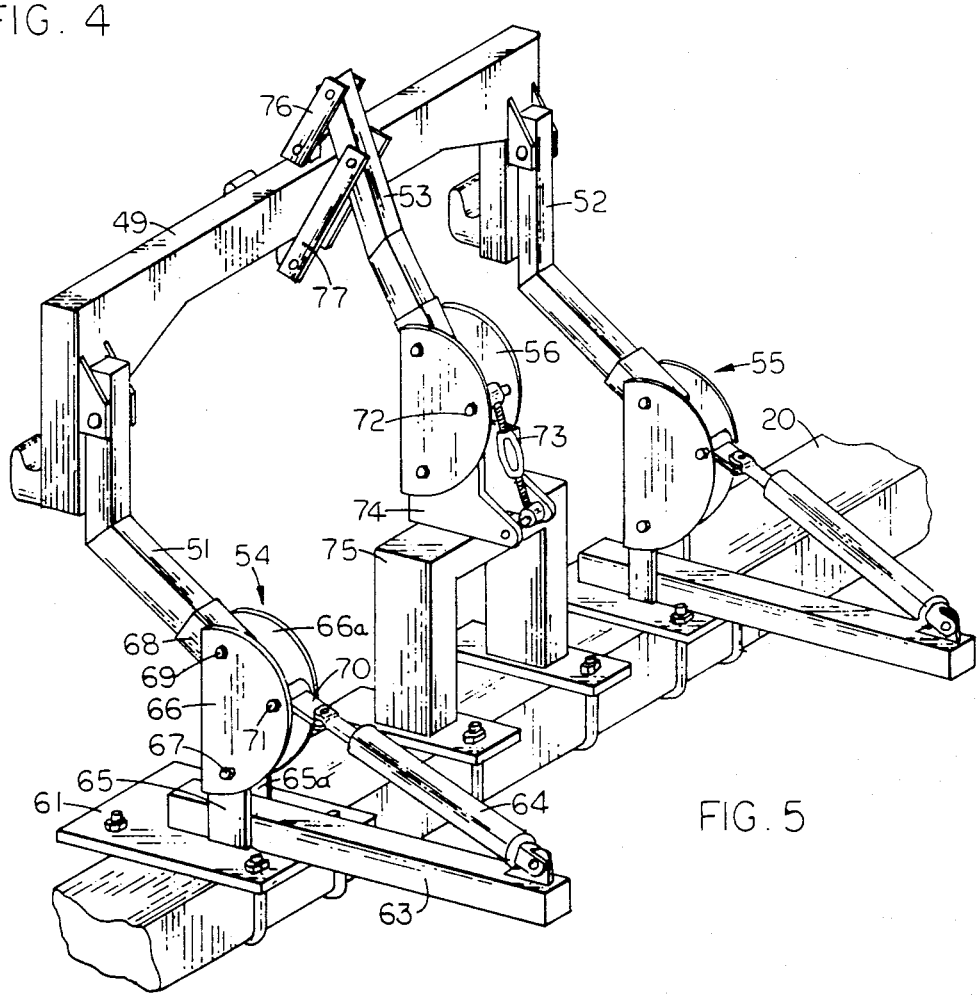
FIG. 5 is a perspective view of a hitch-and-lift assembly using special hinges operated by hydraulic cylinders.
Figure 6:
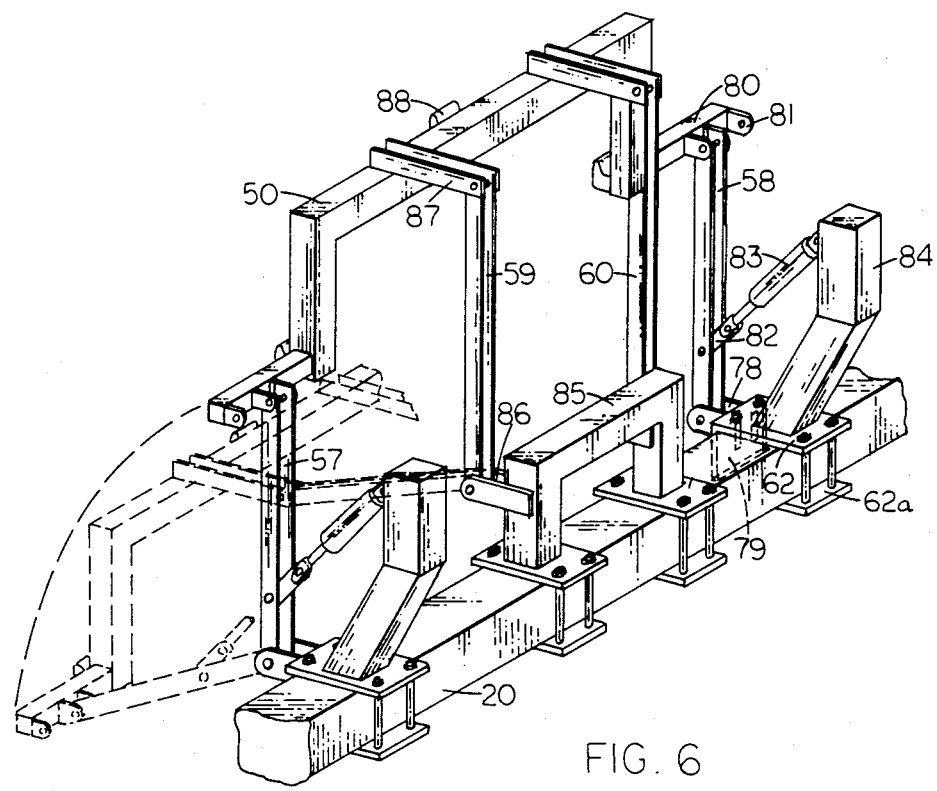
FIG. 6 is another embodiment of a hitch-and-lift assembly for connecting implements to tool beams.
Figure 7:
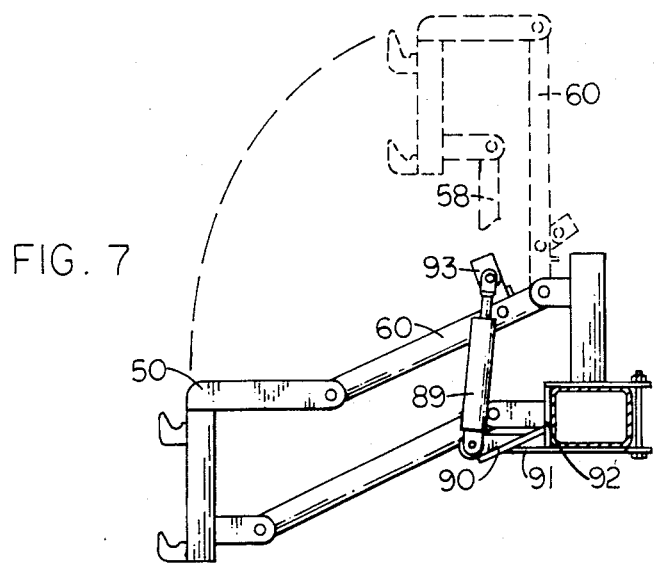
FIG. 7 is a fragmentary view to show a different connection of hydraulic cylinders to the assembly that is shown generally in FIG. 6.

Two embodiments of hitch-and-lift assemblies to be used for assemblies 21, 23, 47 and 48 on tool beams 16 and 20 as shown in FIGS. 1 and 2 are shown in FIGS. 5 and 6, and a modification of the assembly of FIG. 6 is shown in FIG. 7. In order to illustrate that a plurality of hitch assemblies can be positioned on each of the tool beams 16 and 20 as required for different widths of ground working implements, two hitch assemblies 47 and 48 are shown on the right tool beam 20 in FIG. 2 rather than a single hitch assembly 21 shown in FIG. 1. The frame and the quick-connect hitch assemblies 49 and 50 of FIGS. 5 and 6 respectively are the three-point type commonly available having two coupling members depending from the respective ends of a frame and a higher, central coupling member at the center of the frame. In FIG. 5, the frame of the hitch 49 is connected to the tool beam 20 by three arms 51–53 and respective special hinges 54–56 of the type described above, and in FIG. 6, the frame of the hitch 50 is connected to the tool beam 20 by four parallel arms 57–60. Each hitch assembly has four supporting plates 61 or 62 across the top of the beam 20 for supporting the respective pivotal arm arrangements for the hitches 49 and 50. Each of the plates 61 or 62 are upper portions of clamps fastened to the beam 20 by U-bolts across the lower side of the beam as shown in FIG. 5 or by lower plates with bolts through the ends of upper and opposite lower plates as shown in FIG. 6. These clamps permit the hitches to be positioned at any location along the beam 20 and can be readily slid along the beam 20 by loosening the respective bolts.

In FIG. 5, a piece of rectangular tubing 63 is secured to the upper surface of the plate 61 and extends forwardly to provide a bracket to which one end of a cylinder 64 is attached. A pair of short, flat bars 65 and 65a extend upwardly from opposite sides of the tubing 63 above a central portion of the plate 61 to provide a fixed pivotal point for the hinge 54. With reference to FIG. 4, the bars 65 and 65a correspond to the fixed bars 37 and 37a of the similar hinge 36. Somewhat semi-circular plates 66 and 66a, corresponding to the plates 38 and 38a of FIG. 4, a longer one of two linkages, are pivotally connected to the bars 65 and 65a by a bolt 67. A piece of tubing 68 at the lower end of the arm 51 is pivotally connected to the plates 66 and 66a by a bolt 69 located at a point opposite the bolt 67. A shorter one of the two linkages (not shown) corresponding to the linkage 39 of FIG. 4 is connected from a pin through the bars 65 and 65a to the piece of tubing 68 at a point spaced from the bolt 69. The wall of the tubing 68 is cut away as required to permit the required motion of the short linkage corresponding to the linkage 39. A short bar 70 that functions to connect pivotally one end of the cylinder 64 to a bolt 71 passes through the outer plates 66 and 66a of the hinge 54 at points near the centers of their arcuate edges. The cylinder 64 and the corresponding cylinder for the hinge 55 are shown in retracted positions while the hitch 49 is raised, the cylinders being extended to lower the hitch.

The upper, central hinge 56 to which the center arm 53 is connected follows the hitch 49 to maintain it vertical, and the bolt 72 corresponding to the bolt 71 of the hinge 54 is connected to one end of a turnbuckle 73 rather than to a cylinder. The opposite end of the turnbuckle 73 is connected only when the hitch 49 is raised to a bracket 74 that extends forwardly from a raised center frame. The connection of the turnbuckle 73 to the bracket 74 is very important as a safety precaution to prevent implements from being accidently lowered to the ground while they are being transported sideways on trailing tool beams 16 and 20. The central brackets 75 have two downwardly extending ends welded to the respective plates that are across the upper surface of the tool beam 20. The upper end of the connecting arm 53 is connected to the center of the hitch 49 by relatively short linkages 76 and 77. The length of the linkage 76 is preferably adjustable for maintaining the hitch in a desirable vertical attitude.

In FIG. 6, the lower end of each of the outer parallel arms 57 and 58 is pivotally connected to a bracket 78 that extends rearwardly from a plate 79 fixed between the rear ends of the mounting plates 62 and 62a that extend over the upper and lower sides respectively of the tool beam 20. A bracket 80 having three or more spaced forward ears 81 extends horizontally outwardly from each end of the frame of the hitch 50. The mounting plates 62 and 62a for each of the parallel arms 57 and 58 are slid along the tool beam 20 to align the respective parallel arm with the space between two selected adjacent ears 81 according to the amount of spacing that is desired between the arms 57 and 58. In this manner when wheels of certain equipments, such as wheels of planters, are attached to the arms 57 and 58 the desired spacing between rows can be obtained. A link 82 is connected between the parallel arm 58 at a point spaced from the bracket 78, and one end of a cylinder 83, and the other end of the cylinder is connected upwardly and forwardly to the upper end of a bracket 84. The bracket 84 extends upwardly and forwardly from the rear portion of the bracket 62 across the upper side of the tool beam 20.

A frame 85 for connecting the center arms 59 and 60 to the tool beam 20 has a raised horizontal portion and vertical end portions attached to respective plates clamped to the beams. Short pieces of iron bars extending rearwardly from the upper part of each of the vertical end pieces form brackets 86 to which the lower ends of the inner parallel arms 59 and 60 are pivotally connected. The upper ends of the arms 59 and 60 are connected to brackets 87 connected to the upper side of the hitch 50. The brackets 87 are preferably adjustable in length for determining the vertical attitude of the hitch 50, and also a hook-shaped member 88, one of the three-point connectors, at the center of the frame is preferably adjustable in height.

In FIG. 6, a respective cylinder 83 is connected through a link 82 to each one of the outer arms 57 and 58 such that the pair of cylinders 83 are retracted when the hitch 50 is raised, and the cylinders are extended when the hitch is lowered. In a modification shown in FIG. 7, a cylinder 89 is connected to each of the central, parallel arms 59 and 60 in place of the cylinders 83 connected to the outer arms 57 and 58, and the cylinder is extended when the hitch 50 is in a raised position and is retracted when the hitch is in a lowered position. The bracket 90 extends rearwardly from a plate 92 between the rear ends of the intermediate plates corresponding to plates 62 and 62a (FIG. 6), and a reinforcing member 91 is formed by a continuation of the lower plate corresponding to plate 62a to engage the lower surface of the bracket 90. The lower end of the cylinder 89 is pivotally connected to the rearward end of the bracket 90, and the upper end of the cylinder 89 is connected through a link 93 to the respective upper arm 59 or 60 at a point spaced a short distance from the forward pivotal connection of the arm.

Figure 8:
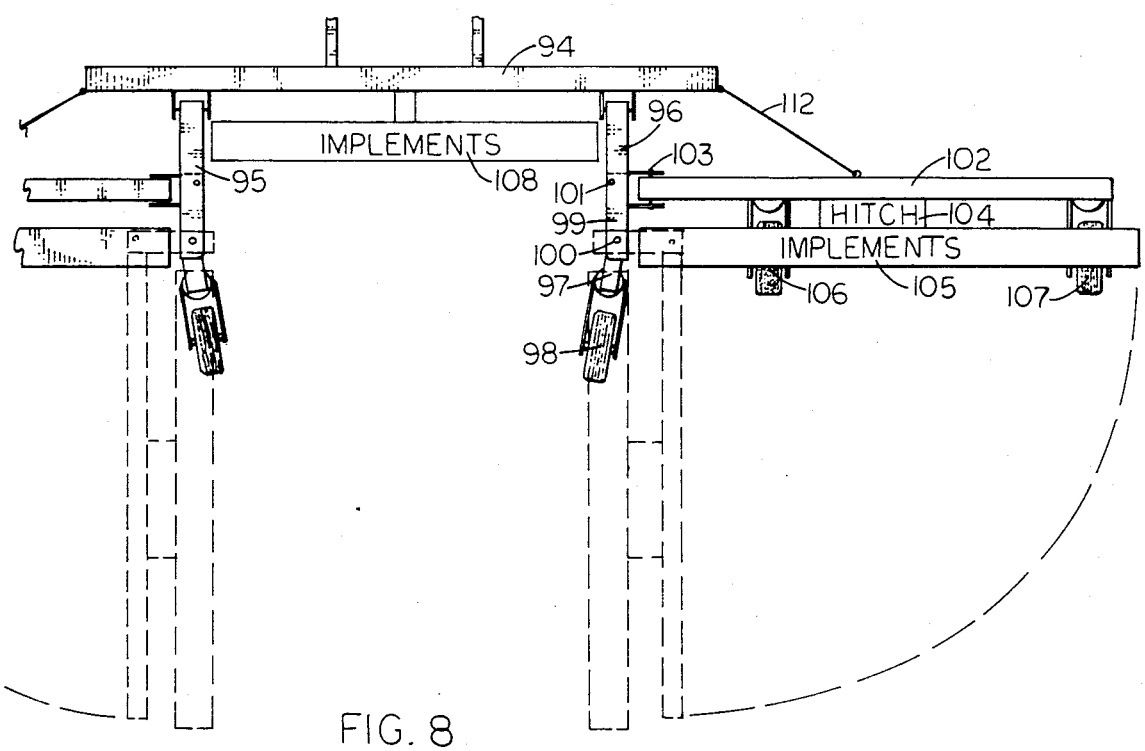
FIG. 8 is another embodiment of a folding tool beam and lift assembly showing a tool beam in a transverse working position and in a trailing transporting position.

The modification of a folding tool beam and lift assembly shown in FIG. 8 is somewhat simpler than the assembly shown in FIG. 1 and does not require hyraulic cylinders to move tool beams between working positions and transporting positions. This system differs from that shown in FIG. 1 in that a transverse draft beam 94 has only a single rigid section that is relatively short compared with the entire length of the three-piece beam 12 of FIG. 1.

Rather than transverse wing portions 13 and 17 of FIG. 1, the assembly has longitudinal connecting beams 95 and 96 pivotally connected to the rearward side of the beam 94 near its respective ends. The rear end of each of the longitudinal connecting beams 95 and 96 is connected to a caster wheel, for example, the beam 96 is connected through a rearwardly extending pivotal arm 97 to a rear caster wheel 98. The longitudinal connecting beam 96 turns about a transverse, horizontal axis of its front pivotal connection for permitting the caster wheel 98 to follow the contour of the ground. A relatively short beam 99 is a part of a hinge connected by a pivot 100 with a vertical axis near the rear end of the longitudinal connecting beam 96, and in a normal working position, the beam 99 is rotated forwardly within the beam 96 and is secured by a pin 101 passing through both beams 96 and 99 at a point near the end of the beam 99 opposite the pivot 100. A right tool beam 102 is connected by a pivot 103 to the forward end of the beam 99 to position the beam 102 outwardly in a working position while the pin 101 retains the beam 99 within the longitudinal connecting beam 96.

The beam 102 of FIG. 8 like the beam 20 of FIG. 1 has a hitch-and-lift assembly 104 of the type shown either in FIGS. 5 or 6 for connection to implements 105. Caster wheels 106 and 107 are connected to the right tool beam 102 close to the hitch-andlift 104 and close to the end of the beam respectively to support the beam and to permit it to follow the contour of the ground about the pivot 103 as well as about the pivot at the front end of the longitudinal connecting beam 96. As shown in dashed lines, the right beam 102 and the corresponding left beam trail longitudinally to position the implements inwardly between the tool beam during transportation.

Since the implements connected to the right tool beam 102 and the corresponding left tool beam are spaced apart approximately the distance between the longitudinal connecting beams 95 and 96, implements 108 are connected by a usual hitch to the center of the draft beam 94 to work the space between the left and right tool beams. The usual three-point hitch of the tractor is raised and lowered in a usual manner to control the height of the implements 108.

Figure 9:
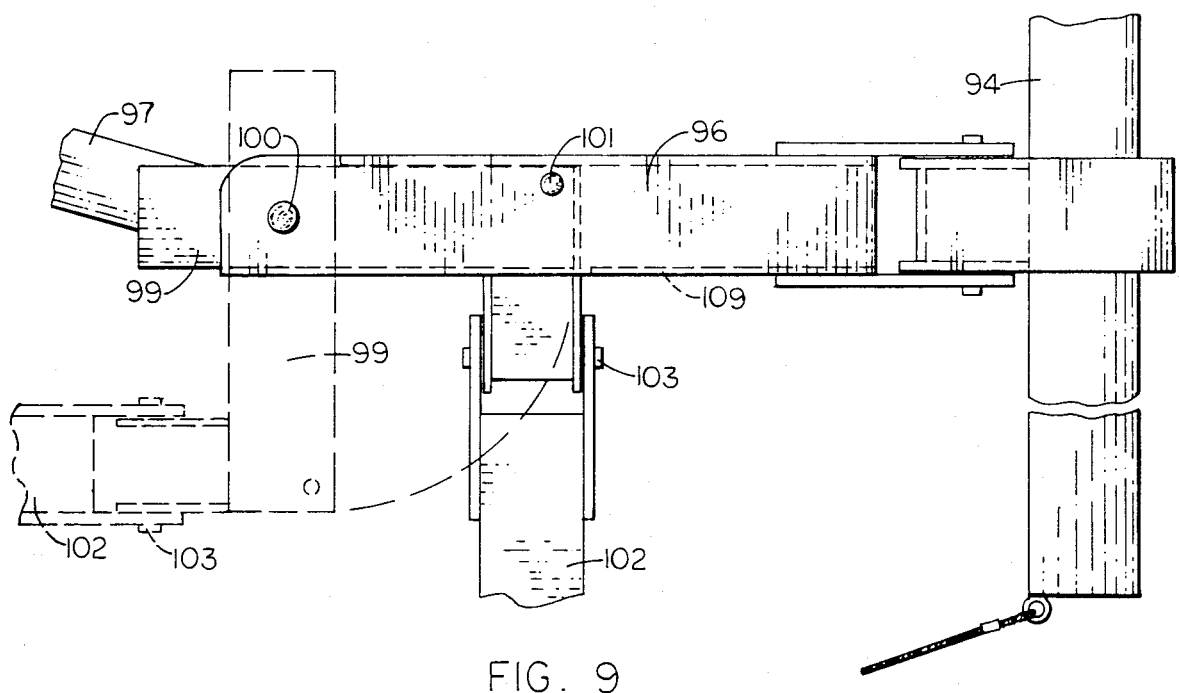
FIG. 9 is a detailed view of a hinge used in the assembly of FIG. 8.

As shown in FIG. 9, the side wall of the longitudinal connecting beam 96 as shown by the dashed line 109 is cut away along the rear end of a piece of tubing used for the beam, and the rear outer side is cut away sufficiently to permit the rotation of the short beam 99 of the hinge within the upper and lower outer walls of the piece of tubing for the beam 96. A portion facing the center of the entire assembly, of the side wall of the beam 96 functions as a stop for the short beam 99 when the beam is in the position for working.

While the folding tool beam of FIG. 1 is in operation, a left guy 110 is connected outwardly and rearwardly from the outer end of the wing portion 13 of the draft beam 12 to an outwardly spaced point on the left tool beam 16, and likewise a guy 111 is connected from the outer end of the wing portion 17 to the right tool beam 20. Each of the guys 110 and 111 may include a shortening device such as a turn buckle, and each guy is easily unfastened to prepare for changing the tool beams 16 and 20 to transporting positions. The hitch-and-lift assemblies 21 and 23 are controlled individually to raise their respective implements so that the width of working can be controlled to effectively work only longer rows at a point in a field.

When the implements 22 and 24 of FIG. 1 are to be positioned for transportation, the hydraulic cylinders, as shown in the embodiment of FIG. 5 for the hitch-and-lift assemblies 21 and 23, are operated to raise the implements 22 and 24. As shown in FIG. 5, a safety link having the turn buckle 73 is secured to a bracket 74 at each hitch-and-lift assembly 21 and 23 for maintaining the implements raised independently of the operation of the hydraulic cylinders. The guys 110 and 111 are then loosened, and the hydraulic cylinders, corresponding to the cylinder 45 shown in FIG. 2, for the right and left tool beams are operated for rotating the respective hinges, shown in FIG. 2 as hinge 36, until the tool beams 16 and 20 are positioned in a trailing position perpendicular to the draft beam 12. To disconnect the field implements, the hydraulic cylinders corresponding to the cylinder 45 of FIG. 2 may be actuated to position the respective tool beams 16 and 20 in slanting positions with respect to the draft beam 12; the safety device 73 at the hitches 21 and 23 are loosened; the implements are lowered and the conventional hitches are disconnected; and then the folding tool beam assembly is moved forward to leave the implements. The placement of the implements facilitates their reconnection after field work requiring other implements is completed.

When the embodiment of FIG. 8 is being used, a guy 112 is connected from each end of the draft beam 94 outwardly to a respective tool beam 102. If desired, the guy 112 may be constructed of three pieces of angle iron pivotally connected to function as a clasp that can be folded during field operation. To change the position of the tool beams 102 from a working position to a transporting position, the retaining pin 101 for each of the sides is removed, and the forward movement of a tractor that is hitched to the draft beam 94 will cause each tool beam corresponding to the tool beam 102 to move to a trailing position. When the beams 102 are to be changed from a transporting position to a working position, the tractor is reversed such that the drag on the tool beam 102 is applied to the outer end of the short beam 99 of the hinge holds the beam 99 back between the upper and lower sides of the longitudinal connecting beam 96 until the retaining pin 101 can be replaced.

I claim:

1. A folding tool beam assembly for implements to be drawn by a tractor comprising:

a draft beam to be hitched in a transverse position to said tractor, first and second tool beams to which implements are to be hitched, a longitudinal connecting beam connected between each of said tool beams and said draft beam, said longitudinal connecting beams having respective front ends pivotally connected to said draft beam at points spaced a substantial distance apart on said draft beam to permit space between said tool beams for said implements while said tool beams are in a longitudinal trailing position, each of said longitudinal connecting beams being pivoted to turn only about a transverse horizontal axis, a first caster wheel assembly connected to the rear end of each of said longitudinal connecting beams, a hinge connecting one end of each of said first and second tool beams to a respective one of said longitudinal connecting beams at respective positions spaced rearward from said draft beam, a second caster wheel assembly connected to each of said first and second tool beams at respective positions spaced from said one end thereof, each of said hinges having a folding connecting beam, a first pivot connecting one end of said folding connecting beam to a respective one of said longitudinal connecting beams, and a second pivot connecting the other end of said folding connecting beam to said one end of said respective tool beam, each of said tool beams being disposed substantially perpendicular to said respective folding connecting beam such that said folding connecting beams are substantially folded along said respective longitudinal connecting beam and said respective second pivots are in a forward location with respect to said first pivots while said tool beams are in respective outward transverse working positions, said first and second pivots of said hinges being spaced apart a substantial distance, each of said hinges having respective stops to limit the rotation of said respective second pivot outward about said respective first pivot between said forward location and an outward location such that forward movement of said draft beam relative to said tool beams positions said tool beams in said respective longitudinal trailing positions and rearward movement of said draft beam relative to said tool beams positions said tool beams in said respective outward transverse working positions, each of said first pivots permitting rotation only about a vertical axis and each of said second pivots permitting rotation only about a horizontal axis, retaining means connected at will between each of said hinges and said respective longitudinal connecting beams to maintain said tool beams in said transverse working positions, and said hinges permitting said tool beams to turn thereabout in only vertical directions to follow contour of ground while said tool beams are retained in said working positions.

2. A folding tool beam assembly as claimed in claim 1 having plurality of hitch-and-lift assemblies, each of said hitch-and-lift assemblies having a movable hitch portion, first and second outer supporting members and a central supporting member, each of said supporting members adapted to be secured to one of said tool beams at any desired position along the length thereof, said outer supporting members spaced apart to be opposite respective ends of said movable hitch portion, said central supporting member positioned opposite an upper central point of said respective movable hitch portion, an outer arm extending between each of said ends of each of said movable hitch portions and a respective one of said outer supporting members, an intermediate arm extending between each of said upper central points of each of said movable hitch portions and a respective one of said central supporting members, individual pivotal means connecting said arms to said supporting members, and actuating means connected between at least one of said arms of each of hitch-and-lift assemblies and said respective one of said supporting members, said actuating means being operable to raise and lower said respective movable hitch portions and said implements to be connected individually to said movable portions of said hitch-and-lift assemblies.

3. A folding tool beam as claimed in claim 2 wherein each of said hitch-and-lift assemblies has a safety tie member connected between one of said arms and said respective supporting member while said respective movable hitch portion is raised, and said safety tie members being easily disconnected to permit lowering of said movable hitch portions.

* * * * *